(12) United States Patent
Lang et al.

(10) Patent No.: US 8,088,337 B2
(45) Date of Patent: Jan. 3, 2012

(54) OZONE GENERATOR AND AN ELECTRODE THEREOF

(75) Inventors: Helmut V. Lang, Wettingen (CH); Guido Vezzu, Pfungen (CH); Marcel Suter, Zurich (CH)

(73) Assignee: Ozonia International, Rueil Malmaison (FR)

( * ) Notice: Subject to any disclaimer, the term of this patent is extended or adjusted under 35 U.S.C. 154(b) by 985 days.

(21) Appl. No.: 11/576,197

(22) PCT Filed: Nov. 9, 2004

(86) PCT No.: PCT/FR2004/002879
§ 371 (c)(1),
(2), (4) Date: Jan. 28, 2008

(87) PCT Pub. No.: WO2006/051173
PCT Pub. Date: May 18, 2006

(65) Prior Publication Data
US 2008/0260603 A1    Oct. 23, 2008

(51) Int. Cl.
*B01J 19/08* (2006.01)
(52) U.S. Cl. .................................. 422/186.18
(58) Field of Classification Search .............. 422/186.18
See application file for complete search history.

(56) References Cited

U.S. PATENT DOCUMENTS

| 4,886,645 A | 12/1989 | Fischer et al. |
| 5,145,653 A | 9/1992 | Fischer et al. |
| 6,217,833 B1 | 4/2001 | Kolu |

FOREIGN PATENT DOCUMENTS
WO   89/00975 A   2/1989

*Primary Examiner* — Kishor Mayekar
(74) *Attorney, Agent, or Firm* — Connolly Bove Lodge & Hutz LLP

(57) ABSTRACT

The inventive ozone generator comprises at least one tubular external electrode (4), at least one internal electrode (7), wherein each internal electrode consists of a plurality of tubular metal segments (8) which are closed at least partially at each end and externally ceramic-coated, said tubular segments are disposed one behind another, mechanically decoupled from each other and electrically connected, a rod (11) axially crosses the tubular segments (8) and is provided on the end thereof with means (12, 13) for axially clamping the tubular segments to each other in such a way that an electric contact is formed. Each tubular metal segment (8) is provided at each end thereof with an outwardly convex bottom (8*a*, 8*b*) which is embodied substantially in the form of a spherical cap, comprises a central area (18) for electric contact and is provided with a ceramic coating (9) consisting of at least two thin layers (9*a*, 9*b*).

12 Claims, 2 Drawing Sheets

OZONE GENERATOR AND AN ELECTRODE THEREOF

This application is the National Stage of International Application No. PCT/FR04/002879 filed on Nov. 9, 2004; the entire contents of all are hereby incorporated by reference.

FIELD OF THE INVENTION

The invention relates to an ozone generator of the type which comprises:
  at least one tubular external electrode,
  at least one internal electrode comprising a plurality of tubular metal segments which are closed, at least partially, at each end and externally coated with ceramic, these tubular segments being positioned one behind the other, mechanically coupled and electrically linked,
  means of holding the tubular segments relative to the external electrode to form an annular discharging interstice,
  a rod passing axially through the tubular segments and provided at its ends with means of axially clamping the tubular segments to each other, to establish electrical contact,
  means for connecting all the electrodes to an alternating current source, and
  means for circulating a gas containing oxygen in the interstices.

BACKGROUND OF THE INVENTION

An ozone generator of this type is known, for example, from U.S. Pat. No. 5,145,653. In such a generator, by applying an AC voltage across the electrodes that satisfies certain limiting conditions, corona discharges take place in the interstice between the surface of the dielectric formed by the ceramic coating and the external electrode. These discharges cause ozone to be produced. The use of ceramic as the dielectric coating makes it possible to obtain ozone production efficiencies that are higher than with a glass coating. In particular, the ozone content in the gas leaving the generator can exceed 12% by weight.

However, the ceramic coating is relatively fragile and cracks can appear which prevent a good distribution of the surface electric charges, which can cause the acceptable voltage limit for the ceramic to be locally exceeded. This can result in a breakdown of the ceramic coating and cause the generator to be taken out of service.

The mechanical stresses created by the axial clamping of the ceramic-coated tubular segments can also contribute to the appearance of cracks in the ceramic coating.

SUMMARY OF THE INVENTION

The object of the invention is, primarily, to provide an ozone generator which no longer, or to a lesser extent, presents the drawbacks summarized above. In particular, it is desirable for the design of the generator to allow for a good resistance of the ceramic coating to the mechanical and electrical stresses so that the risk of cracks in the ceramic coating is significantly reduced, and the efficiency of the device is enhanced.

According to the invention, an ozone generator of the type defined previously is characterized in that each tubular metal segment is provided, at each end, with an externally convex end plate, roughly in the form of a spherical cap, comprising a central area for electrical contact, and in that the ceramic coating comprises at least two layers deposited in succession.

The assembly exhibits an enhanced resistance to the mechanical and electrical stresses.

The risks of cracking of the ceramic coating are significantly reduced.

Preferably, the assembly is designed for each internal electrode to withstand, without cracking of the ceramic coating, a torque at least twice the rated torque, exerted at the end of the axial rod.

The thickness of each layer is preferably between 50 and 300 μm.

Each layer of the ceramic coating is advantageously deposited by slurry coating, or powder coating, or plasma spraying.

The external surface of the tubular segments can exhibit a roughness, in particular in the form of grooves, to enhance the keying of the ceramic coating. The depth of the grooves or irregularities is advantageously of the order of 0.1 mm. As a variant, the outer surface of the tubular segments can be roughened by sandblasting.

The central area of each end plate of a tubular element comprises an orifice delimited by a cylindrical flange ring projecting externally in the axial direction, beyond the ceramic coating, relative to the end plate.

Preferably, the external and internal electrodes and the tubular segments are made of stainless steel.

The invention also relates to an internal electrode, for the ozone generator as defined previously, comprising a plurality of tubular metal segments which are closed, at least partially, at each end and externally coated with ceramic, these tubular segments being positioned one behind the other, mechanically decoupled and electrically linked, a rod passing axially through the tubular segments and being provided at its ends with means of axially clamping the tubular segments to each other, to establish the electrical contact, characterized in that each tubular metal segment is provided, at each end, with an externally convex end plate, roughly in the form of a spherical cap, comprising a central area for contact, and in that the ceramic coating comprises at least two layers deposited in succession.

BRIEF DESCRIPTION OF THE DRAWINGS

Apart from the abovementioned provisions, the invention involves a certain number of other provisions that will be more explicitly described below in relation to an embodiment described with reference to the appended drawings, but which is by no means limiting. In these drawings.

DETAILED DESCRIPTION OF THE PREFERRED EMBODIMENTS

Figure 1:
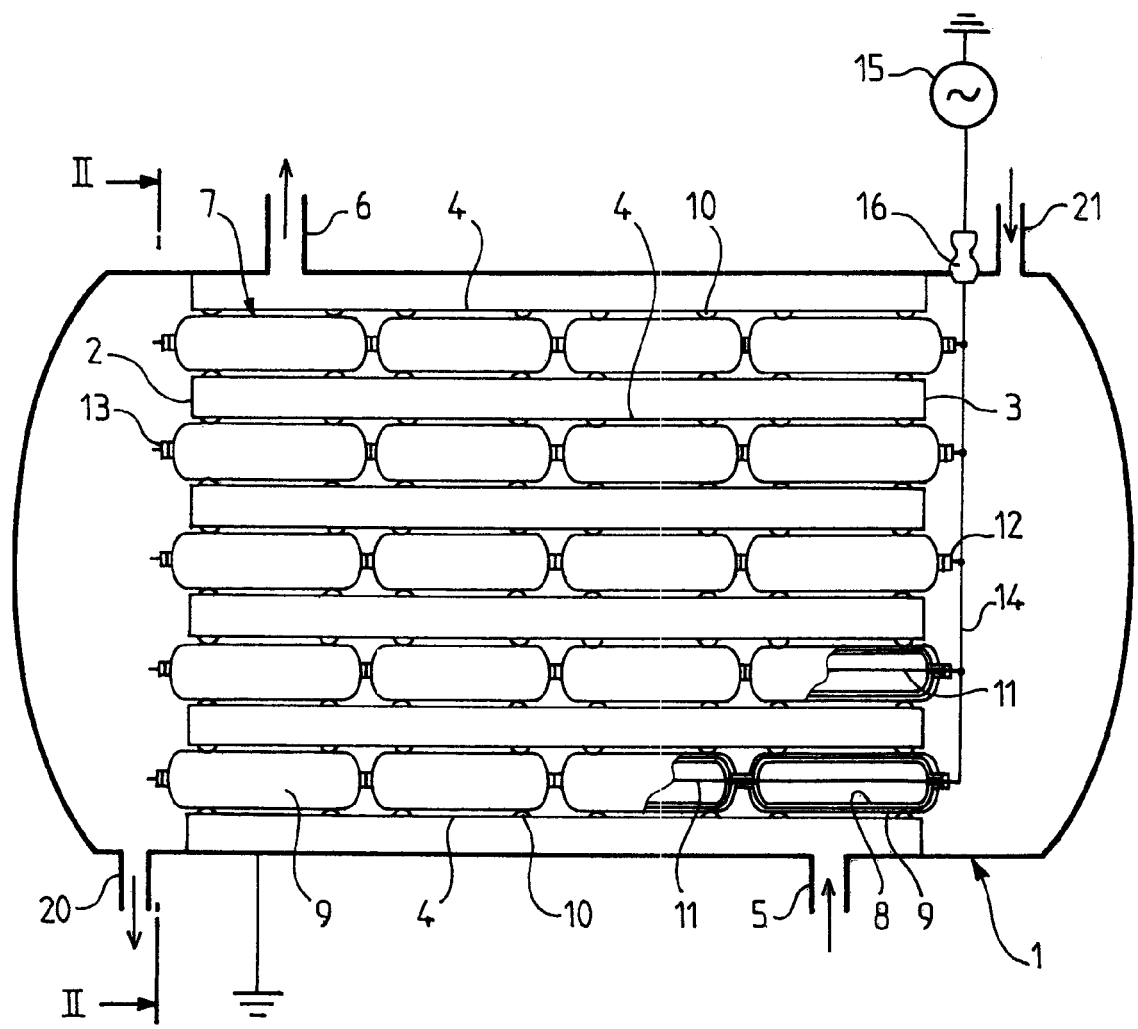
FIG. 1 is a diagrammatic lengthwise vertical cross section of an ozone generator according to the invention.
Figure 3:
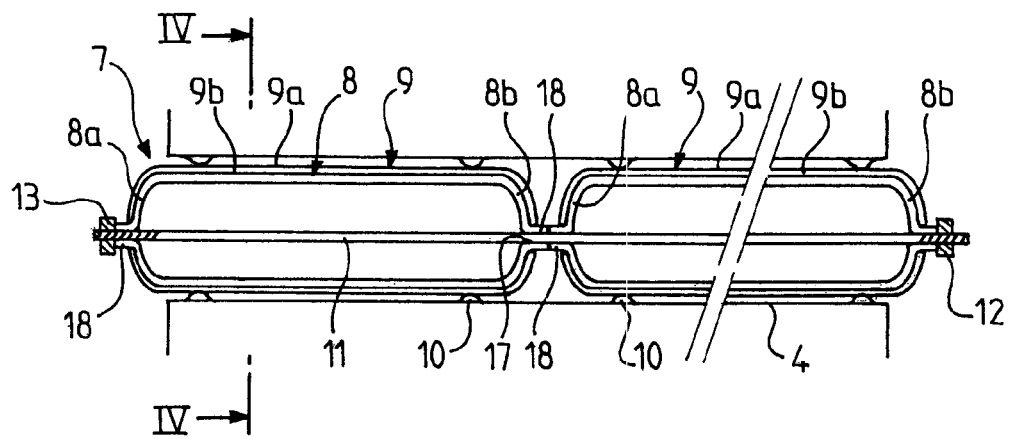
FIG. 3 is a larger-scale partial lengthwise vertical cross section, similar to FIG. 1.
Figure 2:
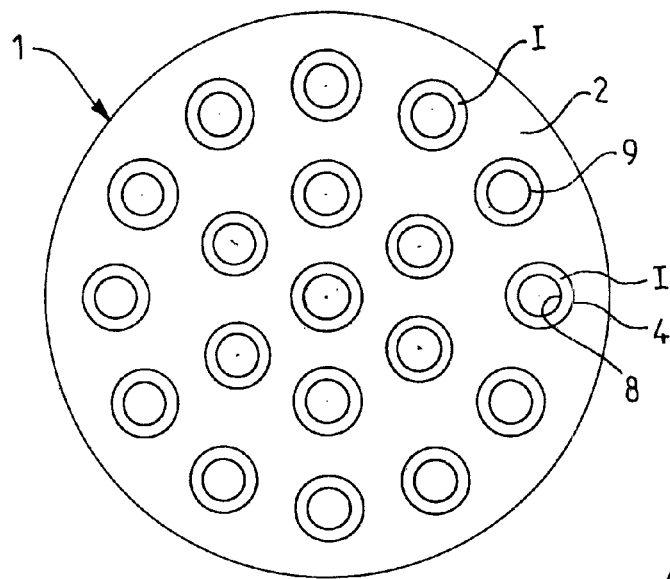
FIG. 2 is a vertical cross section seen from the left along the line II-II of FIG. 1.

Referring to FIG. 1 in the drawings, an ozone generator is shown, arranged in a tank 1, of generally cylindrical form, closed at its ends. The tank 1 comprises, in the vicinity of each of its longitudinal ends, a wall 2, 3 orthogonal to the axis of the tank. Each wall has opposing holes in which are fitted tubes 4 extending from one wall 2 to the other wall 3. The length of the tubes 4 can be of the order of two meters or more. The ends of the tubes 4 are welded respectively to the walls 2 and 3. The metal tubes 4 constitute the external electrodes connected to the ground potential. It can be considered that the set of tubes 4 form a single external electrode. For reasons of clarity, the number of tubes 4 represented in FIG. 1 is limited, but, in practice, the number of tubes can be greater than 100.

The tubes 4 are fixed in a leaktight manner to the inside of the tank and to the walls 2, 3, which are also fixed in a leaktight manner, in particular by welding, to the cylindrical wall of the tank 1. A coolant, water for example, is used to externally cool the tubes 4. The coolant is introduced through an inlet 5 and drained through an outlet 6.

An internal electrode 7 is positioned inside each tube 4. Each internal electrode 7 is made of a plurality of tubular metal segments 8, closed at least partially at each end and provided with an external ceramic coating 9. The tubular segments 8 are positioned one behind the other, in alignment; they are mechanically decoupled and electrically linked by their ends that are in contact with each other.

Means 10 of holding the tubular segments 8 relative to the external electrode 4 are provided to form an annular discharging interstice I between the external surface of the ceramic coating 9 and the internal surface of the external electrode 4. The means 10 are formed, for example, by insulating projections fixed to the internal wall of the tubes 4.

A metal rod 11 passes axially through the tubular segments 8 and exits at each end. The end sections of the rod 11 are threaded and provided with a clamping nut 12, 13 bearing against the end plate of the last adjacent segment 8. One end of each rod 11, the one located on the right according to FIG. 1, is electrically linked to a conductor 14, which is in turn linked to the high voltage terminal of an AC voltage source 15. An insulator 16 surrounds the conductor 14 at its point of entry through the wall of the vessel 1.

Each tubular metal segment 8 is provided, at each end, with an externally convex end plate 8a, 8b, roughly in the form of a spherical cap, which is in particular roughly hemispherical. The radius of curvature of the end plate 8a, 8b can be different from the radius of the cylindrical part of the tubular segment 8.

The central area of the end plate 8a, 8b has an orifice 17 for the rod 11 to pass through. This orifice 17 is delimited by a cylindrical flange ring 18 oriented externally relative to the end plate 8a, 8b.

Figure 4:
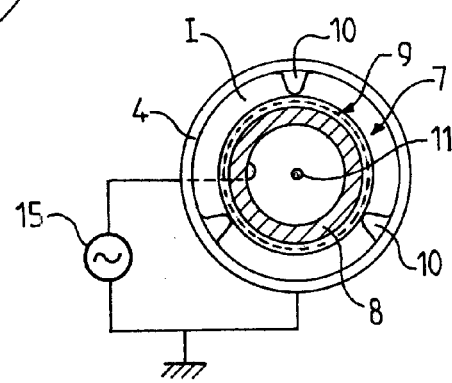
FIG. 4 is a larger-scale diagrammatic transverse cross section along the line IV-IV of FIG. 2.
Figure 5:
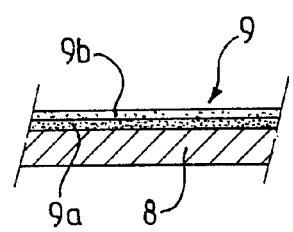
FIG. 5 is a larger-scale partial lengthwise cross section of the wall of a tubular segment and of its coating.

The ceramic coating 9, for a given thickness, is made up of at least two thin layers 9a, 9b (FIG. 4). The sum of the thicknesses of the layers 9a, 9b corresponds to the desired thickness. The layers 9a, 9b are deposited in succession on the tubular segment 8. The number of layers 9a, 9b can be greater than two, in particular equal to three. The thickness of each layer 9a, 9b is preferably between 50 and 300 μm.

The ceramic coating 9 covers the cylindrical part and the convex end plates 8a, 8b of the tubular segment, but the axial end of the flange ring 18 projects from the coating 9. Thus, the flange rings 18 of two successive tubular segments 8 can bear against each other and establish the electrical contact when axially clamped using the rod 11 and the nuts 12, 13.

Advantageously, the external surface of the tubular segments 8 has a roughness that is sufficient to enhance the keying of the ceramic coating 9.

Figure 6:
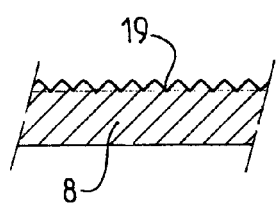
FIG. 6 is a larger-scale partial transverse cross section of the wall of a tubular segment, before coating, with grooves on its external surface.
Figure 7:
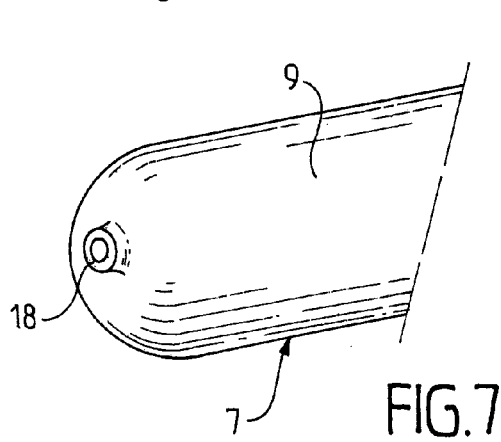
FIG. 7 is a perspective view of the end of a tubular segment of an internal electrode according to the invention.
Figure 8:
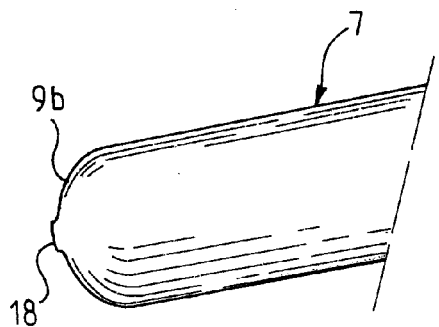
FIG. 8 is a side view of the end of a tubular segment on a scale different from FIG. 7.

According to a first possibility, the tubular segment 8 comprises on its external surface, grooves 19 (FIG. 6), typically annular rotation-wise about the axis of the segment, the depth of which is of the order of 0.1 mm. As a variant, the roughness of the external surface of the segments 8 is obtained by sandblasting at adequate compressed air pressure.

The tube 4 and the tubular segments 8 are preferably made of stainless steel, as are the walls 2 and 3 and the tank 1.

Means for circulating a gas containing oxygen, in particular air, inside the generator comprise an inlet nozzle 21 on the tank opening into the space between the wall 3 and the adjacent end plate of the tank. The gas can circulate in the interstices I to arrive in a chamber delimited by the wall 2 and the other end plate of the tank. The ozone-enriched gas is discharged through an outlet nozzle 20.

The ceramic used for the coating 9 is chosen to satisfy the following requirements:
  strong adhesion to the surface of the steel tubular segment 8;
  high resistance to mechanical stresses;
  appropriate thermal expansion coefficient;
  high dielectric withstand strength, greater than 10 kV/mm;
  dielectric capacitance that can be adjusted;
  stability with regard to oxidants.

Among these requirements, the first two are the most difficult to satisfy.

The adhesion of the ceramic can be easily tested using a hammer to strike the surface of the ceramic. The resulting configuration of the flakes or slivers should resemble conical holes, the tips of which are formed by steel points on the wall of the tubular segment. A configuration showing greater areas of the steel wall of the tubular segment clearly indicates inadequate adhesion of the ceramic.

The roughness of the surface of the tubular segment 8, obtained as explained previously, considerably enhances the keying of the ceramic coating.

The mechanical strength of the ceramic coating can be verified on assembling the tubular segments 8 in a generator. For this, a torque greater than the rated torque is exerted on the nuts 12 or 13 located at the ends of the axial rod 11. For example, the testing torque is greater than twice the rated torque. Thus, when the torque of the nuts 12, 13 is designed to be of the order of 1 Nm, the mechanical resistance test on the ceramic coating is performed with a torque of approximately 3 Nm. According to the invention, the tubular segments 8 with convex end plates coated with at least two layers 9a, 9b support such a torque without cracks appearing in the ceramic coating.

The convex surface, roughly in the form of a spherical cap, of the ends 8a, 8b of the tubular segments, has a radius of curvature ensuring an optimal transition for the electrical field. The rounded form of the ends 8a, 8b makes it possible to avoid excessively sharp corners and excessively abrupt variations of the electrical field between the external electrode and the internal electrode.

A generator according to the invention well withstands the shocks of pressure and/or voltage and/or temperature. Such shocks appear, in particular, following instabilities due to the decomposition of the ozone when its content exceeds 12% of the gas by weight. For such a content, when the ozone decomposes, pressure shocks with the release of heat take place.

The operation of the generator according to the invention is the immediate result of the above explanations.

The air that enters through the nozzle 21 flows through the interstices I and is subject to electrical discharges because of the voltage between the internal electrode 7, 8 and the external electrode 4. Ozone is produced and the ozone-enriched air exits through the nozzle 20.

A generator according to the invention has correctly operated:

- at a high test voltage of 16 kV instead of the 10 kV normally provided;
- with charges ranging up to 12 kw/m² instead of 6 kw/m², in normal operation, to provoke an external insulation fault;
- with mechanical torques exerted on the nuts 12 or 13 ranging up to 6 Nm instead of the 2 Nm normally provided.

Despite these extreme operating conditions, no cracks appeared in the ceramic coatings of the tubular segments 8.

The invention claimed is:

1. An ozone generator comprising:
   at least one tubular external electrode (4),
   at least one internal electrode (7) comprising a plurality of tubular metal segments (8) which are closed, at least partially, at each end and externally coated with a ceramic coating (9), these tubular segments being positioned one behind the other, mechanically decoupled and electrically linked,
   means (10) for holding the tubular segments relative to the external electrode to form an annular discharging interstice (I) between an external surface of the ceramic coating (9) and an internal surface of the external electrode (4),
   a rod (11) passing axially through the tubular segments (8) and provided at its ends with means (12, 13) of axially clamping the tubular segments to each other, to establish electrical contact,
   means (14) for connecting all the electrodes to an alternating current source, and
   means (20, 21) for circulating a gas containing oxygen in the interstices,
   characterized in that each tubular metal segment (8) is provided, at each end, with an externally convex end plate (8a, 8b), roughly in the form of a spherical cap, comprising a central area (18) for electrical contact, and in that the ceramic coating (9) comprises at least two layers (9a, 9b) deposited in succession.

2. The generator as claimed in claim 1, wherein it is designed to withstand, without cracking of the ceramic coating (9), a torque at least twice the rated torque, exerted at the end of the axial rod (11).

3. The generator as claimed in claim 1, wherein the thickness of each layer (9a, 9b) of ceramic is between 50 and 300 µm.

4. The generator as claimed in claim 1, wherein each layer (9a, 9b) of the ceramic coating is deposited by slurry coating, or powder coating, or plasma spraying.

5. The generator as claimed in claim 1, wherein the external surface of the tubular segments (8) exhibits a roughness.

6. The generator as claimed in claim 5, wherein the outer surface of the tubular segments (8) is grooved (19).

7. The generator as claimed in claim 6, wherein the depth of the grooves (9) is of the order of 0.1 mm.

8. The generator as claimed in claim 5, wherein the external surface of the tubular segments (8) is roughened by sandblasting.

9. The generator as claimed in claim 1, wherein the central area of each end plate of respective tubular metal segments comprises an orifice (17) delimited by a cylindrical flange ring (18) projecting externally in the axial direction, beyond the ceramic coating (9), relative to the end plate.

10. The generator as claimed in claim 1, wherein the external (4) and internal (7) electrodes and the tubular segments (8) are made of stainless steel.

11. The generator as claimed in claim 1, wherein the radius of curvature of the end plate (8a, 8b) of the tubular segment (8) is roughly equal to the radius of the cylindrical part of the tubular segment (8).

12. An internal electrode for the ozone generator as claimed in claim 1, comprising a plurality of tubular metal segments (8) which are closed, at least partially, at each end and externally coated with ceramic, these tubular segments being positioned one behind the other, mechanically decoupled and electrically linked, a rod (11) passing axially through the tubular segments and being provided at its ends with means (12, 13) of axially clamping the tubular segments to each other, to establish the electrical contact, characterized in that each tubular metal segment (8) is provided, at each end, with an externally convex end plate (8a, 8b), roughly in the form of a spherical cap, comprising a central area for electrical contact, and in that the ceramic coating (9) comprises at least two layers (9a, 9b) deposited in succession.

* * * * *